United States Patent
Holmes et al.

(10) Patent No.: US 7,092,712 B2
(45) Date of Patent: Aug. 15, 2006

(54) METHOD AND APPARATUS FOR ALERTING A STATION IN ONE NETWORK OF A REQUESTED COMMUNICATION FROM A SECOND NETWORK

(75) Inventors: David William James Holmes, Redmond, WA (US); Adrian Smith, Kirkland, WA (US)

(73) Assignee: Cingular Wireless II, LLC, Atlanta, GA (US)

(*) Notice: Subject to any disclaimer, the term of this patent is extended or adjusted under 35 U.S.C. 154(b) by 0 days.

(21) Appl. No.: 10/241,432

(22) Filed: Sep. 12, 2002

(65) Prior Publication Data
US 2003/0013442 A1 Jan. 16, 2003

Related U.S. Application Data

(63) Continuation of application No. 09/740,181, filed on Dec. 18, 2000, now Pat. No. 6,459,897, which is a continuation of application No. 08/777,336, filed on Dec. 27, 1996, now Pat. No. 6,230,009.

(51) Int. Cl.
*H04Q 7/20* (2006.01)

(52) U.S. Cl. ............ 455/445; 455/417; 455/414.1; 370/352

(58) Field of Classification Search ......... 455/426, 455/405, 410, 445, 415, 417, 433, 435, 552, 455/553, 461; 379/88.17, 93.01; 370/389, 370/352–357, 401, 485, 351, 395.52
See application file for complete search history.

(56) References Cited

U.S. PATENT DOCUMENTS

| | | | |
|---|---|---|---|
| 5,127,042 A | | 6/1992 | Gillig et al. |
| 5,313,654 A | | 5/1994 | Comroe et al. |
| 5,371,898 A | | 12/1994 | Grube et al. |
| 5,392,452 A | | 2/1995 | Davis |
| 5,396,539 A | | 3/1995 | Slekys et al. |
| 5,457,680 A | | 10/1995 | Kamm et al. |
| 5,487,175 A | | 1/1996 | Bayley et al. |
| 5,504,803 A | | 4/1996 | Yamada et al. |
| 5,546,444 A | | 8/1996 | Roach, Jr. et al. |
| 5,555,553 A | | 9/1996 | Jonsson |
| 5,590,133 A | * | 12/1996 | Billstrom et al. ............ 370/349 |
| 5,604,737 A | * | 2/1997 | Iwami et al. ............... 370/352 |
| H1641 H | | 4/1997 | Sharman |
| 5,726,984 A | * | 3/1998 | Kubler et al. ............... 370/349 |
| 5,737,706 A | | 4/1998 | Seazholtz et al. |
| 5,742,905 A | * | 4/1998 | Pepe et al. .................. 455/461 |

(Continued)

OTHER PUBLICATIONS

Wireless Data Network Infrastructure at Carnegie Mellon University by Alex et al. teaches seamless access to multiple wireless data network.*

(Continued)

*Primary Examiner*—Jean Gelin
(74) *Attorney, Agent, or Firm*—Kenyon & Kenyon LLP

(57) ABSTRACT

A mobile station can be selectively coupled to two or more networks. By maintaining an address translation table and introducing communication between the switching control units within the multiple networks, it is possible to provide notification to the mobile station of the existence of a communication request from a first network while the mobile station coupled to the second network.

8 Claims, 2 Drawing Sheets

U.S. PATENT DOCUMENTS

| | | | | |
|---|---|---|---|---|
| 5,793,763 A | * | 8/1998 | Mayes et al. | 370/389 |
| 5,797,099 A | | 8/1998 | Ejzak et al. | |
| 5,802,456 A | | 9/1998 | Hulsebosch | |
| 5,805,997 A | * | 9/1998 | Farris | 455/461 |
| 5,966,642 A | * | 10/1999 | Raffel | 455/512 |
| 6,011,794 A | * | 1/2000 | Mordowitz et al. | 370/389 |
| 6,069,890 A | * | 5/2000 | White et al. | 370/352 |

OTHER PUBLICATIONS

Universal Mobile Addressing in the Internet by Jorge A. Cobb teaches the use of a triple (M, N, d) as an address for mobile station in multi-network system.*

IP innovation fosters mobility without address headaches by Richard Bob discloses how mobile IP works.*

* cited by examiner

FIG. 1
(PRIOR ART)
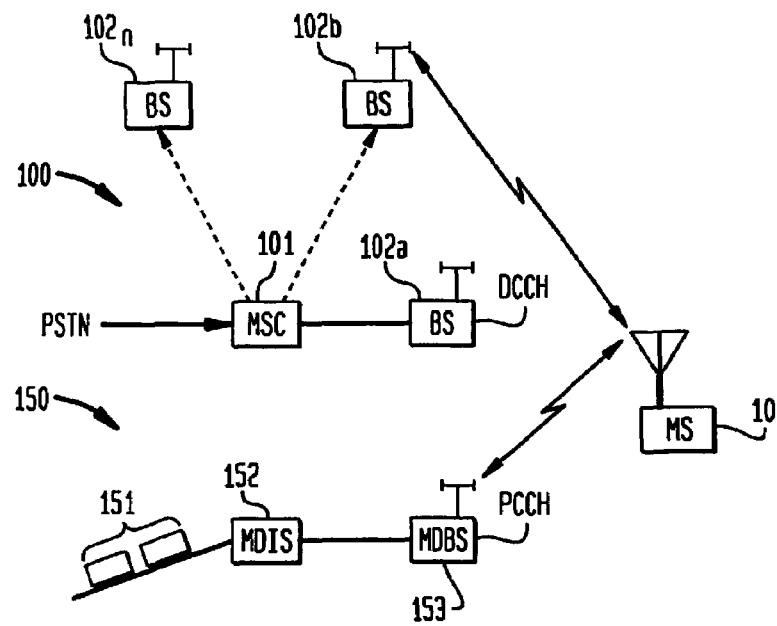
FIG. 2
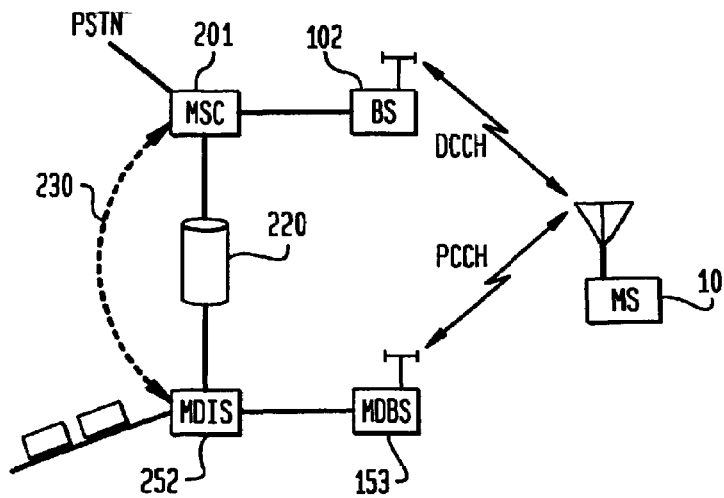
FIG. 3
| MIN | IP ADDRESS |
|---|---|
| XXX XXXX | YYY.YYY.YY.YY. |
| | |
| | |

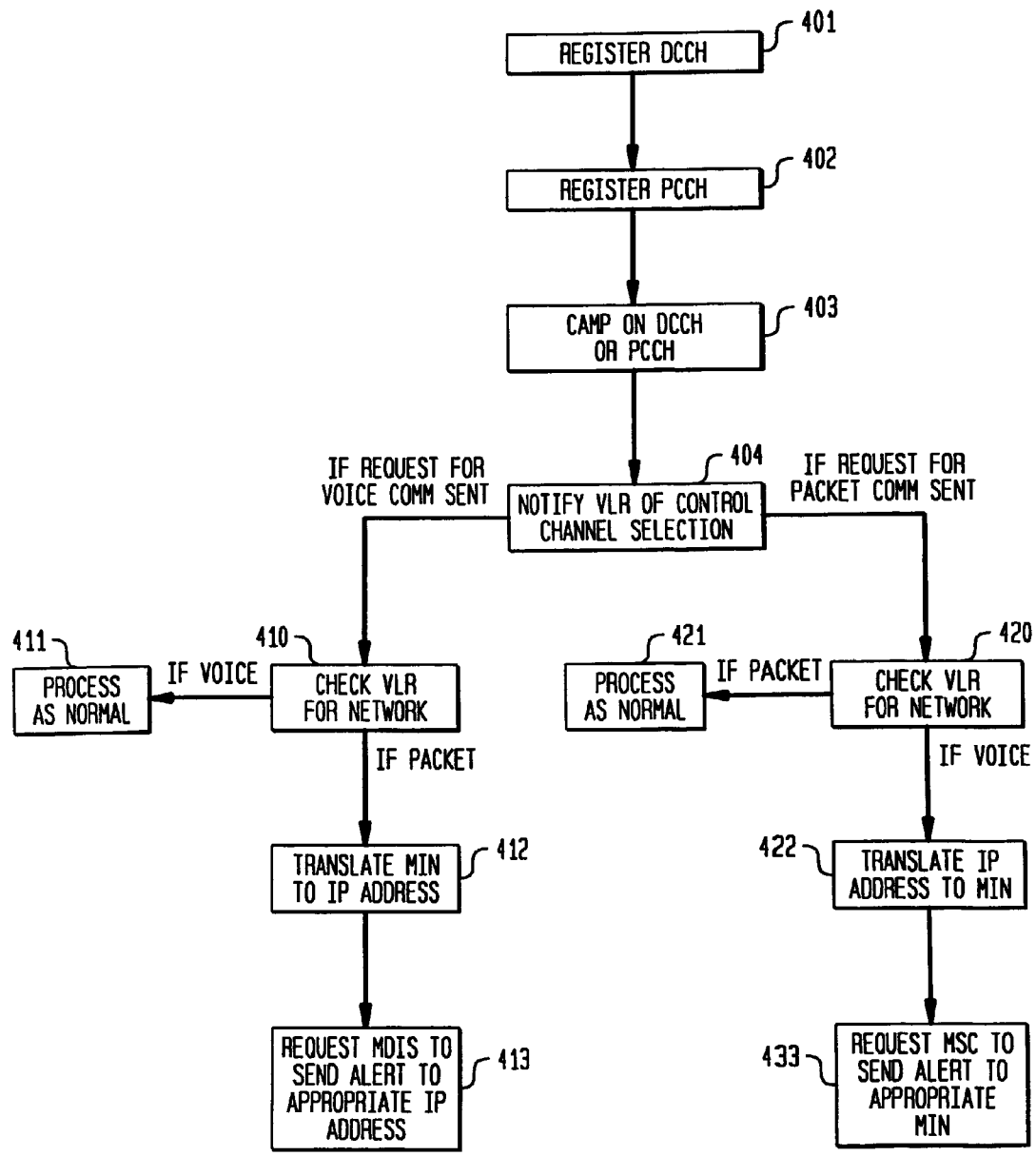

METHOD AND APPARATUS FOR ALERTING A STATION IN ONE NETWORK OF A REQUESTED COMMUNICATION FROM A SECOND NETWORK

This application is a continuation of U.S. patent application Ser. No. 09/740,181, filed Dec. 18, 2000, now U.S. Pat. No. 6,459,897, which is a continuation of U.S. patent application Ser. No. 08/777,336, filed Dec. 27, 1996, now U.S. Pat. No. 6,230,009, each of which are incorporated herein by reference in their entireties.

The present application is directed to a method and system for alerting a mobile station coupled to a first network that a communication request from the station appears on a second network. More particularly, the present invention is directed to a method and system for tracking which network a mobil station is coupled to and then translating address information to communicate alert message to the mobile station with regard to communications on yet another network.

It is known in the field of wireless communications to provide mobile terminal devices in accordance with a standard referred to as IS-136. In accordance with that standard the mobile terminal can have the capability of conducting communication on at least tow different networks. One network is the standard wireless voice network while the other network is a packet data network commonly referred to as CDPD (Cellular Digital Packet Data).

An example of a known communication configuration is illustrated in FIG. 1. The mobile station 10 is capable of communicating over either one of two networks, a voice network 100 and a packet network 150. In voice network 100 the mobile station 10 can communicate with any one of a plurality of base stations (102a to 102n) depending on the cell in which the mobile station is located. The base stations are coupled to a mobile switching center (MSC) 101 which controls the switching for the wireless communications. The MSC 101 can be coupled to the public switch telephone network (PSTN). Typically, when the user of the mobile station turns on the station it will automatically register with the MSC 101 through the base station serving the cell in which the mobile station is located. The mobile station performs this registration through a digital control channel (DCCH) associated with the base station.

A mobile station 10 is also capable of packet data communication. These communications are handled via packet network 150. Packets symbolically represented as elements 151 are received by a mobile data intermediate system or mobile gateway (MDIS) 152 which in essence is a packet data counterpart to the MSC 101. The MDIS 152 can communicate with a plurality of mobile data base stations such as MDBS 153 which can send wireless transmissions to the mobile station 10 when that station is in the cell served by the MDBS. When the mobile station wishes to register for purposes of engaging in packet data communications, it does so over a packet control channel (PCCH) associated with the MDBS 153.

Presently, because of the different architecture of these two networks, the voice network and the packet network, there is a lack of commonality of interfaces. As a consequence, while the mobile station 10, is "camped on" to the control channel for one of the two networks, (i.e., while it is set to communicate control information to or receive information from a base station relating to one of the control channels), it cannot receive any information from the other network. For example, if mobile station 10 is camped on to a DCCH, then any attempt at providing a packet data transmission or communication to mobile station 10 in the known network configuration, is impossible. There is no way to signal the mobile station 10 over the PCCH since the mobile station is locked onto or camped onto the DCCH. Similarly, should the mobile station be camped onto the packet network, PCCH in anticipation of packet data communication, it is unable to receive any notice of a communication via the voice network.

It is desirable to provide a system in which the mobile station, while active and camped on in one network, can receive notices of communications on another network with which it is capable of communicating.

SUMMARY OF THE INVENTION

In accordance with the present invention, the mobile switching center of the voice network and the MDIS of the packet data network can be in communication with one another either indirectly via a memory or directly. The indirect or direct communications operate to provide mobile station address information from the network on which the mobile station is camped to the alternative network. Then, alternative network, upon receipt of a communication request for the mobile station, can generate a request to the mobile station through the network on which it is camped to advise the mobile station of the existence of an attempted communication on the alternative network. This alert or notice can be generated directly by the alternative network which could use an address translator to identify the address of the mobile station on the network on which it is camped and can create a message of appropriate structure for the network in which the mobile station is camped.

Alternatively, the network receiving the communication request could send a communication request trigger to the network to which the mobile station is camped and that latter network could generate the appropriate address and message alert for the mobile station.

The present invention permits the mobile station to receive notice of communication requests from the network or networks with which it has registered but on which it is not camped (that is, to which it has identified itself while its in the region of interest).

SUMMARY OF THE DRAWINGS

FIG. 1 illustrates a known network configuration of a voice network and a data network with which a mobile station can communicate.

FIG. 2 illustrates a first embodiment of the present invention.

FIG. 3 illustrates an address translation table useful in connection with the embodiment of FIG. 2.

FIG. 4 illustrates a process flow in connection with an implementation of an embodiment of the present invention.

DETAILED DESCRIPTION

FIG. 2 illustrates an embodiment of the present invention. The base station 102, the mobile database station 153 and the mobile station 10 correspond to the same elements that appear in FIG. 1. In accordance with the embodiment of FIG. 2, the mobile switching center 201 and the mobile data intermediate station or gateway 252 are both coupled to a database 220. The two elements are also coupled to one another.

It is known at present that in actual installation, the MSC and MDIS may be in the same rack of equipment. In accordance with the present invention these two elements would now, for the first time, be coupled to one another so as to be able to communicate requests for data transmission through one another to enhance the ability of the mobile station to be notified of pending communication requests.

The database 220 could store an address translation table, an example of which is shown in FIG. 3. That translation table would correlate a mobile identification number (MIN) of the mobile station with the IP (Internet protocol) Address associated with the mobile station. The embodiment illustrated in FIG. 2 could operate in accordance with the process set forth in FIG. 4.

In accordance with a known registration procedure, once the mobile station is turned on, it will register with the DCCH of the cell in which it is located. After registering with the DCCH, the mobile station will then register with the PCCH in step 402. Then, depending on the user's preference for communications, the mobile station will camp onto either the DCCH or the PCCH as indicated in step 403. After camping on, the visitor location register (VLR) for that cell would be notified of the control channel selection of the mobile station in step 404. As a consequence, the VLR would store, for example as a flag, information identifying that network on which the mobile station is camped on.

If a request for a voice communication is sent, then the voice communication request arrives to MSC 201 which checks the VLR for which network the mobile station is camped, step 410. If the mobile station is camped on the DCCH, then the MSC will process the voice communication as normal, step 411. If, however, the MSC determines upon inspection of the VLR that the mobile station is camped on the PCCH in the packet network the processing differs. The MSC can then translate the MIN of the mobile station to an IP address by accessing the address translation table stored in database 220, step 412. Subsequently, the MSC sends a request to the MDIS to send an alert to the appropriate IP address for the MS 10, step 413. In one possible embodiment, the MSC merely sends a trigger along with the IP address and the MDIS creates a packet data signal for transmission to MS 10 over the PCCH. Alternatively, the MSC 201 could take the IP address data and construct its own packet message, thereby replicating a packet data communication request and transmit that request to the MDIS which would then act merely as a pass through device.

Once the mobile station receives the notice of the communication request from the voice network, the mobile station can elect to camp on the DCCH or to not respond to the communication request and remain camped on the PCCH.

An analogous operation is performed at the MDIS when a request for packet communication is received. The MDIS can check the VLR for determination of the network to which the MS is camped on. If MS 10 is camped on the PCCH then MDIS 252 processes the request for packet communication in a normal fashion. If, however, mobile station 10 is camped on the DCCH, then MDIS 252 can access the database 220 to translate the IP address to a MIN, step 422. The MDIS then requests the MSC 201 to send an alert to the appropriate MIN, step 433. As described above, the MDIS could simply transmit a trigger to MSC 201 which would then initiate signaling, via the DCCH, to notify mobile station 10. Alternatively, MDIS 252 could attempt to replicate a voice communication request such as those which arrive from the PSTN using the appropriate MIN.

In accordance with the present invention, the voice network and the packet data network communicate with one another in such a manner that they can notify the mobile station 10 that a communication awaits it on a network to which it is not camped on.

In the embodiment described with respect to FIG. 4, it is described that the mobile station first registers with DCCH and then with PCCH. The order of registration could be reversed.

Furthermore, in the embodiment illustrated in FIG. 2, a separate database is accessible by both the MSC and the MDIS. Other alternatives exist. For instance, the database could be either the MSC or MDIS and not directly connected to the counterpart in the other network. Or, alternatively, MSC and MDIS could each maintain its own address translation table. In such a circumstance then, the MSC and MDIS would have to communicate with one another during the registration process so as to advise one another of the appropriate network addresses for the mobile station to guarantee that they would be properly correlated with one another.

Additionally, the present invention has been described in the context of voice/packet data networks. It has equal applicability to any multimode station capable of communicating with distinct networks in its different operational modes, such as voice and paging networks for example. Thus, in accordance with the present invention, a mobile station which is capable of communicating with multiple networks such as a voice network and a packet data network, can receive notification of the existence of a communication request from one of the networks while the mobile station is camped onto one of the other networks.

What is claimed is:

1. A database, coupled to a mobile switching center, the database to store at least one IP address of a mobile station and at least one identifier used for voice call routing to the mobile station, wherein the mobile switching center retrieves data to translate the identifier used for voice call routing to the IP address by accessing the database.

2. The database of claim 1, wherein the identifier is a MIN.

3. A database, coupled to a mobile switching center and a mobile data intermediate station, the database to store at least one IP address and at least one identifier used for voice call routing, wherein the mobile data intermediate station retrieves data to translate the IP address to the identifier used for voice call routing by accessing the database.

4. The database of claim 3, wherein the identifier is a MIN.

5. A system, comprising:
a database to store data including at least one IP address of a mobile station and at least one identifier used for voice call routing to the mobile station; and
a mobile switching center coupled to the database, wherein the mobile switching center retrieves data to translate the identifier used for voice call routing to the IP address by accessing the database.

6. The database of claim 5, wherein the identifier is a MIN.

7. A system, comprising:
a database to store data including at least one IP address and at least one identifier used for voice call routing;
a mobile switching center coupled to the database; and
a mobile data intermediate station coupled to the database, wherein the mobile data intermediate station retrieves data to translate an IP address to an identifier used for voice call routing by accessing the database.

8. The database of claim 7, wherein the identifier is a MIN.

* * * * *